United States Patent [19]
Brand

[11] Patent Number: 6,112,021
[45] Date of Patent: Aug. 29, 2000

[54] MARKOV MODEL DISCRIMINATOR USING NEGATIVE EXAMPLES

[75] Inventor: Matthew E. Brand, Cambridge, Mass.

[73] Assignee: Mitsubishi Electric Information Technology Center America, Inc, (ITA), Cambridge, Mass.

[21] Appl. No.: 08/994,533

[22] Filed: Dec. 19, 1997

[51] Int. Cl.[7] .............................. G06F 15/18; G06K 9/62
[52] U.S. Cl. .................. 395/500.23; 395/500.27; 382/224
[58] Field of Search ...................... 704/200, 232, 704/236, 238, 240–45, 255, 256; 706/20, 25; 382/46, 181, 159, 18, 190, 224; 364/578; 395/500.23, 500.27

[56] References Cited

U.S. PATENT DOCUMENTS 5,724,487  3/1998  Streit .......................................... 395/24
5,754,681  5/1998  Watanabe et al. ...................... 382/159

OTHER PUBLICATIONS

L. R. Rabiner and B. H. Juang, An Introduction to Hidden Markov Models, IEEE ASSP Magazine, pp 4–16, Jan. 1986.

*Primary Examiner*—Kevin J. Teska
*Assistant Examiner*—Lonnie A. Knox
*Attorney, Agent, or Firm*—Dirk Brinkman

[57] ABSTRACT

Negative examples are used along with positive examples to modify a Markov Model resulting in lower error rates in classification tasks as compared with conventionally trained Markov models. The subject system is used for identifying particular traits or characteristics of sequences to permit identification of, for instance, inappropriate web page material, hand signing gestures, audio program material type, authorship of a text, with the system also being useful in speech recognition, as well as seismic, medical, and industrial monitoring.

20 Claims, 6 Drawing Sheets

MARKOV MODEL DISCRIMINATOR USING NEGATIVE EXAMPLES

FIELD OF INVENTION

This invention relates to classification of signals and more particularly to a system which converts low-performing classification models into near-optimal classifiers with a modest amount of computation.

BACKGROUND OF THE INVENTION

Everywhere that one wants a computer to make sense of a signal, be it speech, electrocardiograms, engine pressure readings, music, video, sunspots, or text, there is a time-series inference problem. Markov models are the best understood and best performing statistical tool for time-series inference, and are used widely in industry and science. A variant called hidden Markov models is the tool of choice for speech recognition, and is a leading candidate for gene-processing and video-processing applications. As examples of their wide utility, hidden Markov models have been used to translate videos of American Sign Language into speech, judge martial arts moves, and predict the spread of disease.

Markov models are most often used for classification, e.g., to answer such questions as "Is the signal coming off the heart monitor most indicative of a healthy heart, a valve problem, an arrhythmia, or early cardiac arrest?" There are efficient algorithms for training and using Markov models, but these produce suboptimal classifiers, resulting in some degree of error. For some applications, the error is tolerably small or can be reduced, expensively, with very large amounts of training data. However, many applications are not yet feasible because the rates of error are still too high. Optimal models are possible in theory, but the mathematical analysis firmly states that training optimal models can take a very long time, even centuries of computation. Note that the algorithms for training suboptimal models run in seconds, minutes or at most hours.

Markov models and their variants provide a compact representation of how a class of sequences tends to evolve in time. These sequences can be text, speech, audio, video, sunspot data, or any non-random time-series. An important property of Markov models is that they can quickly be trained to model a set of example sequences. Then by comparing new sequences to the model, one can judge whether they belong to the same class as the training sequences. For example, it is possible to train one Markov model on texts written by Shakespeare, another on texts written by Conrad, and use the two to classify novel documents by author.

As mentioned above, a variant called hidden Markov models is used when dealing with continuous data, e.g. sequences of real numbers, that is contaminated with noise. This is typically the case when the data comes from a device that measures some physical quantity and returns a stream of numbers, for example, a microphone whose output is digitized. For example, speech recognition systems use a hidden Markov model for each word to calculate the most likely sequence of words given acoustic measurements from a microphone.

A Markov model defines a probability distribution over all possible sequences, in which some sequences are more probable and others are less. As used herein, the term training means estimating parameters for this distribution that maximize the probability of the training examples. There are efficient algorithms for finding the best set of parameters given a training set and an initial guess at the parameter values. This is called the maximum likelihood estimate or MLE. If one has two classes of examples, one trains two Markov models, one on each set. To classify a new example, one then asks which model is most probable for that example. A well-known theorem states that if a Markov model is the appropriate model for the process that generated the sequences, then the MLE parameters will yield classification with the lowest rate of error.

In practice, it is rare that a Markov model is a perfect fit. Consequently, there is some built-in error. One way of understanding the problem is that MLE parameters assign high likelihood not just to training examples, but also to a large range of similar sequences, which may include some examples that belong to another class.

By way of illustration, the probability distribution can be visualized like a topographic map, peaking in the middle of the positive examples. With conventionally trained models, it is not uncommon that some examples from one class "o" are assigned a high probability by the Markov model for the other class, because the training algorithm shapes the distribution to cover the "x" examples, but makes no attempt to avoid the "o" examples. This leads to classification errors. Often classifiers are visualized in terms of decision surfaces. Thus, if one maps each sequence onto a point in some high-dimensional space, the decision surface is the set of points that are assigned equal likelihood by two Markov models. One classifies a sequence by noting which side of the decision surface it lies on. MLE parameters result in decision surfaces that get most of the classifications right, but err with the most unusual examples.

Even so, MLE-based Markov model classifiers work well enough to be of scientific and economic value. Moreover, there is a large range of applications and potential applications that can become practical if the classification error can be further reduced. In the commercial realm, low accuracies are currently an impediment to widespread use of Markov-model based speech recognition systems, visual gesture recognition systems, and industrial process monitoring systems.

This problem is most acute with hidden Markov models. Like Markov models, hidden Markov models are rarely a perfect model for the data, and so the MLE parameters do not necessarily minimize classification error.

As to other approaches, there is a theorem which states that in the case of infinite training data, the optimal classifier has parameters which maximize a measure known as mutual information. This is called the maximum mutual information estimate MMIE. However, it is not known whether these MMIE parameters are preferable to MLE parameters for small or even finite amounts of training data. Unfortunately, training algorithms for MMIE parameters are extremely slow and may not converge to a desirable result in a practical time-scale. For this reason, they are not often used, even within the research community. Thus, the MMIE approach does not have a clear advantage over MLE approach.

Remember that MLE parameters are based only on positive examples of the class. One reason why hard out-of-class examples wind up on the wrong side of the decision surface is that the MLE computation never sees them, so there is no way for the probability distribution to avoid them.

SUMMARY OF THE INVENTION

In order to solve this problem, in the present invention the system computes maximum likelihood ratio estimate MLRE parameters. This involves both positive in-class examples and negative out-of-class examples. Because of the use of negative out-of-class examples as well as the traditional positive examples, the error rate is dramatically reduced. In the subject invention, a discriminator is provided which explicitly maximizes the difference of likelihood between positive and negative examples, thus minimizing classification error. As will be seen, the algorithm used to construct the subject discriminator is exact and terminates in a single step.

In order to implement the system, an algorithm is provided for Markov models, and then modified to handle hidden Markov models.

Case 1: Markov Models

For all Markov model discriminators according to the subject invention, at least two different training sets are provided representing two different classes of interest. From these classes, one provides examples of good sequences of one class to a parameter estimation unit, as well as examples of sequences not belonging to the class. Then, in the subject invention, the parameter estimation unit takes these two sets of sequences and estimates parameters which will distinguish one class from the other. These parameters are then provided to a conventional classification unit which calculates what class a new sequence most likely belongs to.

By way of example, consider the text that one is reading. It is a sequence of characters. If one were to collect statistics on how often any particular character is followed by any other particular character, one would have the beginnings of a first order Markov model. Taking a scenario in which the two character sequence "er" is detected 200 times, while the letter "e" occurs 1000 times, then the probability of seeing "r" following "e" is 200/1000=0.2. A first order Markov model is simply a table of these probabilities tabulated for each pair of symbols.

To produce a Markov discriminator, one obtains all two-symbol counts over all positive sequences, and the same over all negative sequences. Let $M_{i|j+}$ be the average number of times symbol i follows symbol j in the positive example sequences, and $\sigma^2_{i|j+}$ be the variance of this count. Similarly, let $M_{i|j-}$ and $\sigma^2_{i|j-}$ be the mean and variance for negative example sequences. Then the MLRE parameters of the Markov model of the positive examples are obtained according to the following two calculations:

$$P_{ij} = \frac{1}{2} + \frac{1}{2} erf\left(\frac{M_{i|j+} - M_{i|j-}}{\sqrt{2(\sigma^2_{i|j+} + \sigma^2_{i|j-})}}\right)$$

$$P_{i|j} = P_{ij} / \sum_{k=1}^{N} P_{kj}$$

where $P_{i|j}$ are the transition parameters of the Markov model.

The resulting Markov discriminators have been used to identify the language of World Wide Web pages, so that a translation program or dictionary can automatically be provided to the user, before he even sees the document. Using Descartes' Discourse on Method in French and in English translation, in one experiment, two Markov models were trained to model the phonotactics of each language. The Markov models were then used to classify new document containing English or French text plus a variety of formatting commands in both languages. Since this is a relatively easy task for Markov models, they showed 3% error in one trial, and 12% error with a harder set. They were then converted into optimal discriminators by the subject system, which demonstrated 0% error in both trials.

Case 2: Hidden Markov models

A hidden Markov model is, like a Markov model, a table of conditional probabilities. However, the discrete symbols of Markov models are replaced with a probability distribution, so that for any value taken from the data, one only knows probabilistically which row and column from the table to apply. Because of this, one does not have a simple integer count for the events described above. Instead, in the subject invention one substitutes the probability mass, which itself is an MLE estimate of how often each table entry is applicable. First, the conventional training algorithm, known as Baum-Welch re-estimation, is used to train a hidden Markov model of the positive examples. Then the probability mass for each transition in each sequence is calculated via a standard procedure known as forward-backward analysis. The means and variances of the probability mass statistics are then used to calculate MLRE transition parameters as detailed above for Markov models.

The hidden Markov discriminator has been used to translate American Sign language into English text from computer vision data. In one experiment, the subject system boosted performance from 10% error to 0%. In a harder trial, the subject system boosted performance from 27% error to 11%.

In summary, negative examples are used along with positive examples to produce Markov discriminators, with improved classification performance as compared with conventional Markov models. How well each model and thus the full system is discriminating in-class from out-of-class examples is improved when training data from out-of-class examples is combined with data from in-class examples. The subject system is used for identifying particular traits or characteristics of sequences to permit identification of, for instance, inappropriate web page material, hand signing gestures, audio program material type, authorship of a work and sun spot data, with the system also being useful in speech recognition and grammar checking.

BRIEF DESCRIPTION OF THE DRAWINGS

These and other features of the Subject Invention will be better understood in relation to the Detailed Description taken in conjunction with the Drawings, of which.

DETAILED DESCRIPTION

Figure 1:
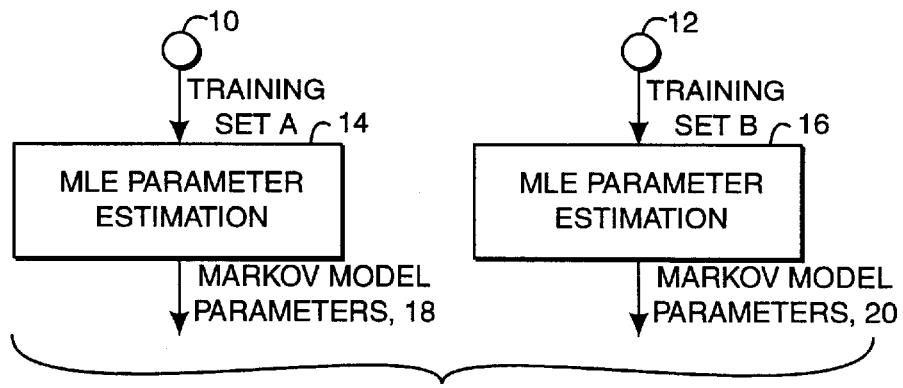
FIG. 1 is a block diagram illustrating the training of Markov Models using the standard MLE method.

Referring now to FIG. 1, for training Markov Models and the standard MLE method, two different training sets, set A and set B are provided as illustrated at 10 and 12. These training sets relate to two different classifications of sequences such as, for instance, a Mozart piece and a Schumann piece. Thus these training sets are in fact sequences representing examples of particular classes of interest, for instance, examples of Mozart and Schumann pieces.

Each of these training sets is applied to its respective MLE parameter estimation unit 14 and 16, the purpose of which is to produce respective Markov Model parameters 18 and 20. The parameter estimation unit provides coefficients in a formula that when applied to new examples, gives a high score for sequences of notes by Mozart as opposed to any other random sequence of notes. The higher the score the higher the probability that the incoming sequence string represents a piece by Mozart or in general is within the class represented by the training set.

The MLE parameter estimation unit initially analyzes the incoming training set examples to find important characteristics of the training set. In essence it looks for correlations between adjoining elements of the sequences. These correlations are often sufficient to uniquely distinguish classes of sequences.

Figure 2:
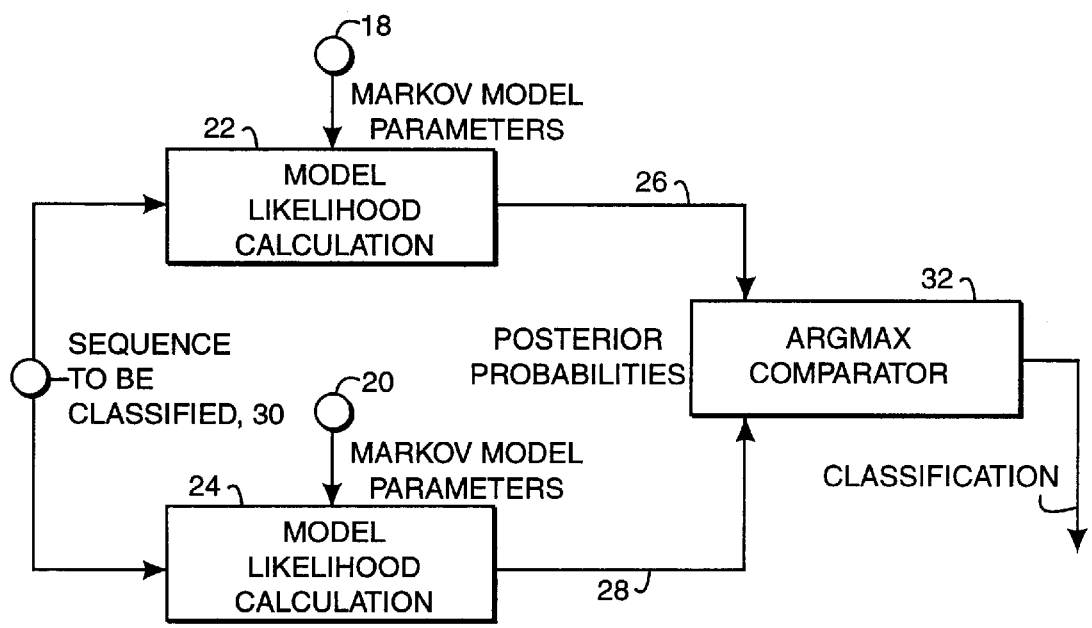
FIG. 2 is a schematic diagram illustrating a standard classifier utilizing Markov Model parameters derived from the MLE parameter estimations of FIG. 1.

Referring now to FIG. 2, having derived Markov Model parameters for each of the two training sets, these parameters are used in model likelihood calculations units 22 and 24, in which a sequence to be classified is applied in parallel to two such units, one such unit being provided with Markov Model parameters from training set A and the other of such units being provided with Markov Model parameters from training set B.

The model likelihood calculation in general is one which compares the correlations between adjoining elements of a new sequence with correlations in the training set, thereby to derive a correlation factor or number; and from this posterior probabilities 26 and 28 are derived, where the term "posterior probabilities" refers to the probability that the model fits the data.

Having provided the posterior probabilities for an incoming sequence 30 to be classified either as having training set A type coefficients or training set B type coefficients, the output is applied to an argmax comparator 32 which functions as follows.

The argmax comparator is designed to pick that model which yields the highest posterior probability, thereby to output the classification of the incoming sequence. The comparator thus picks the argument having the maximum value and provides as an output an indication that the incoming sequence has either a training set A or a training set B likelihood.

It will be appreciated that in the standard parameter estimator negative examples are not taken into account.

Figure 3:
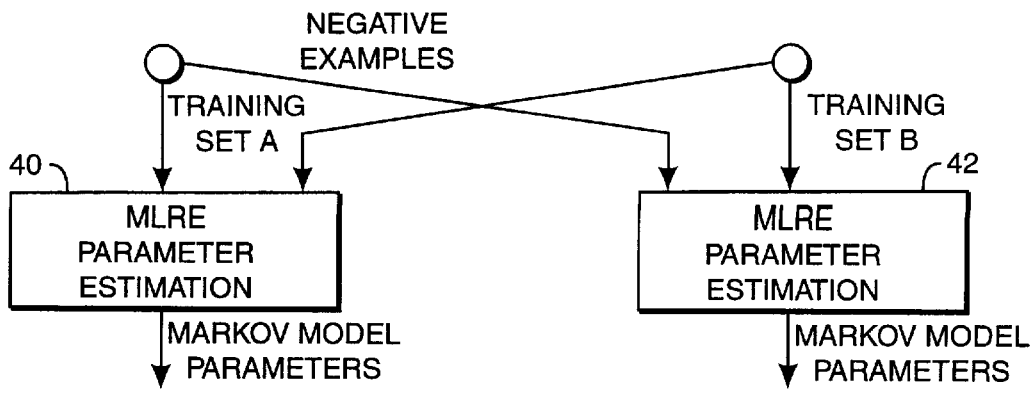
FIG. 3 is a block diagram illustrating the training of Markov discriminators using the subject MLRE method which takes into account negative examples.

Referring now to FIG. 3, in the subject system the training set A is utilized not only to set the coefficients for the Markov Model parameters for training set A in a parameter estimation unit 40, it is also applied to a parameter estimation unit 42 which has been provided with training set B examples. What this means is that when a parameter estimation unit provides its Markov Model parameters it adjusts the coefficients in Markov Model A so they are maximally dissimilar to the coefficients for Markov Model B. Operationally, the MLRE parameter estimation unit increases those parameters that correspond to subsequences which are unique to one class while at the same time decreasing all other parameters. The unit does so in a manner that minimizes probability loss when looking at examples of its own class.

The way that loss is minimized in one operative environment is to recognize that in some cases the differences in correlation are more reliable, while in other cases they are less reliable. The parameters are weighted so that they are adjusted more in the more reliable cases and less in the less reliable cases.

For example, the subsequence "ed" is common in English but rare in French; the opposite holds for "ez". The parameter for "ed" will be increased in the English Markov model and reduced in the French Markov model. The parameter for "ez" will equivalently be decreased in the English Markov model and increased in the French Markov model, but not as much: While "ez" appears more often in French documents than in English documents, the variance is high and therefore "ez" is not a reliable indicator of Frenchness.

In the subject system one compares differences in the mean counts of subsequences between the two classes. The variance in these counts across examples establishes a quality factor as to the reliability of that particular correlation. If differences are wide but the variation is narrow, that particular characteristic is highly discriminant. Therefore, the corresponding parameter will be assigned a higher value.

It will be appreciated that the subject invention takes into account negative examples and in essence subtracts them from positive examples by adjusting a weighting system. Every feature is assigned a weight. Only features that are reliable and unique to the positive examples are weighted strongly. If the negative examples share similar features, then the probability of any examples containing those features is reduced, thus to take into account the negative examples. In addition, features that do not appear reliably in positive examples are also discounted by reducing their weights and thus their probability.

Thus, not only are negative examples utilized to reduce the probability of parts of the positive set that they resemble, nonreliable features also reduce this probability. The result is that the numbers supplied as coefficients to the Markov discriminator result in substantially lower rates of error. In several trials the utilization of the subject technique resulted in zero error.

Figure 4:
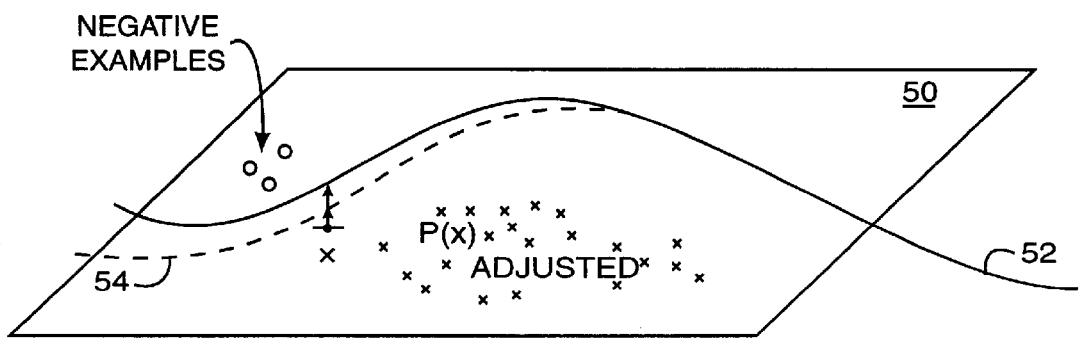
FIG. 4 is a diagram showing a probability contour to illustrate how negative examples impact on the probability assigned to positive examples.
Figure 5:
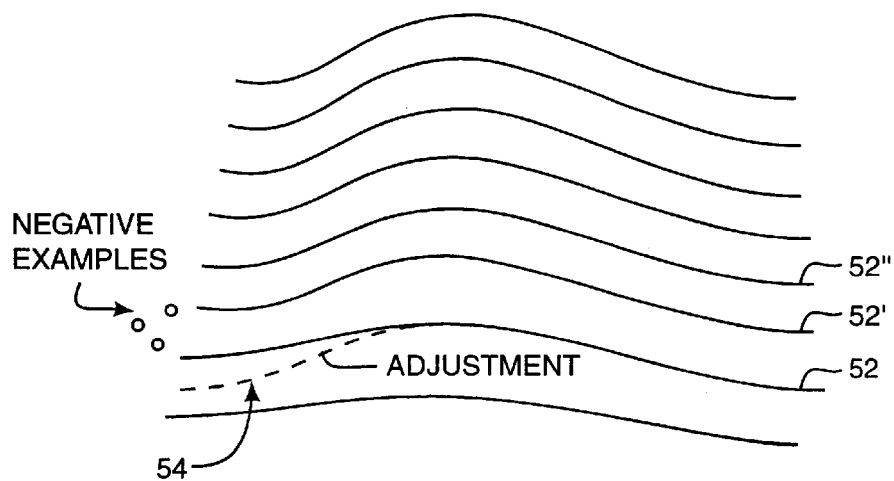
FIG. 5 is a diagram of the probability contour of FIG. 4 redrawn to show that the probability distribution is defined over more than one dimension, also showing that the effect of negative examples locally depresses the distribution.

To illustrate how negative examples affect the probability assigned to positive examples, consider FIG. 4. For pictorial purposes, some examples are located in a plane 50, with examples that share features being placed close to each other. Above the plane is a probability contour 52. The higher the contour, the higher the probability assigned by the Markov model to examples in the plane below it. The dashed line 54 illustrates how the presence of nearby, similar, negative examples depresses the probability of positive examples. In FIG. 5 this is redrawn with several contours 52, 52', 52" . . . to show that the probability distribution is defined over more than one dimension, and that the effect of negative examples locally depresses this distribution as shown at 54 to yield an adjusted probability P(x).

Figure 6B:
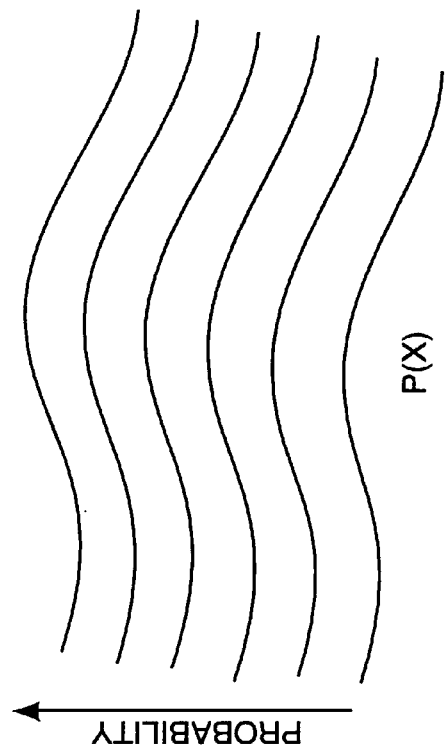
FIG. 6B is a diagram showing the probability distribution for a class of examples labeled "x"
Figure 6A:
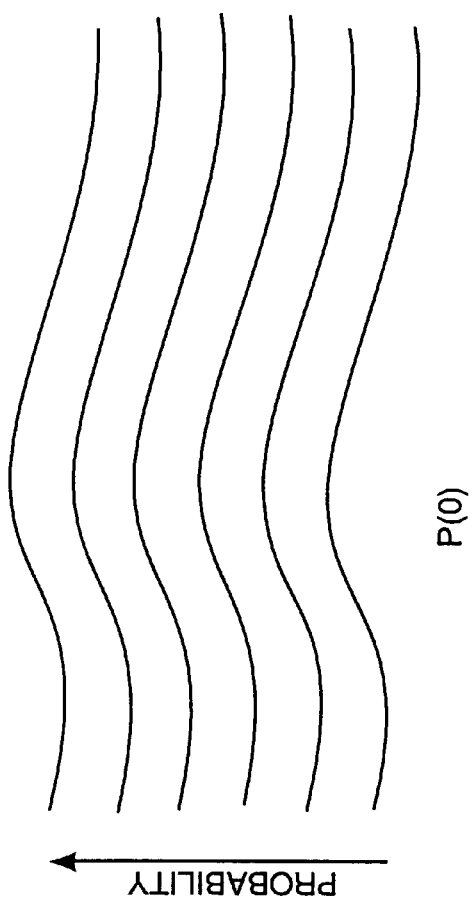
FIG. 6A is a diagram showing the probability distribution for a class of examples labeled "o"
Figure 7:
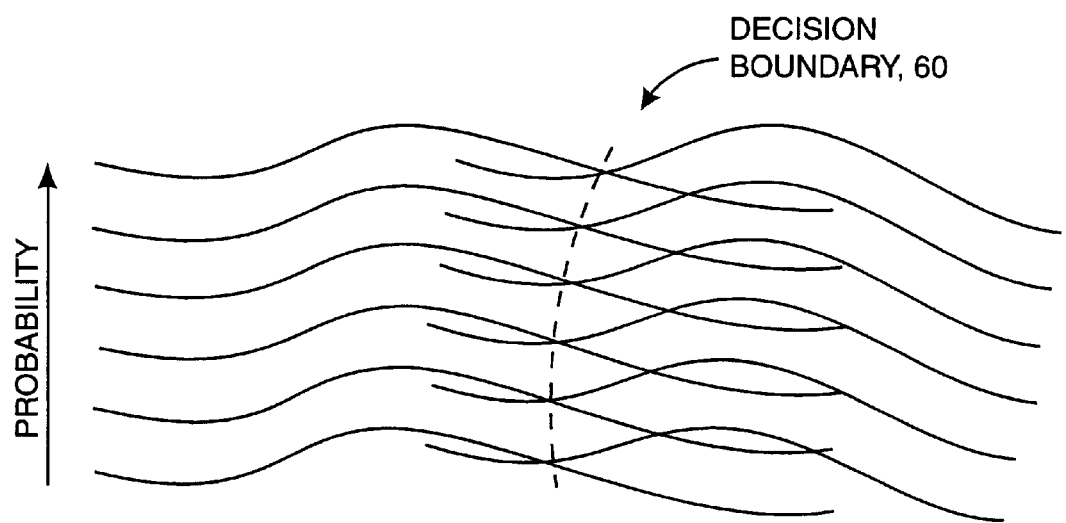
FIG. 7 is a diagram showing the decision boundary formed by the superposition of the FIG. 6A and 6B distributions.
Figure 8A:
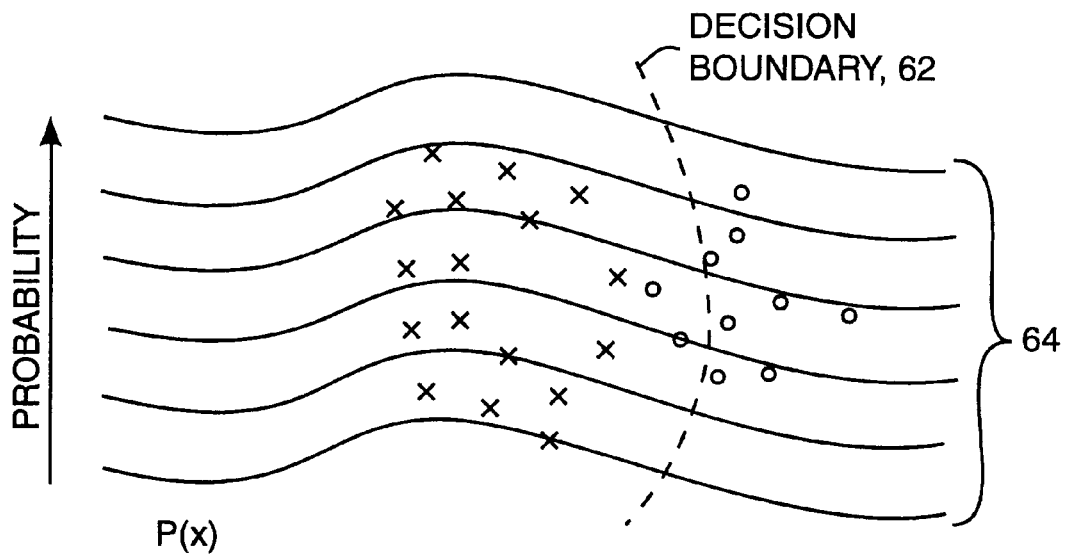
FIG. 8A is a diagram showing the decision boundary obtained from conventional Markov models.
Figure 8B:
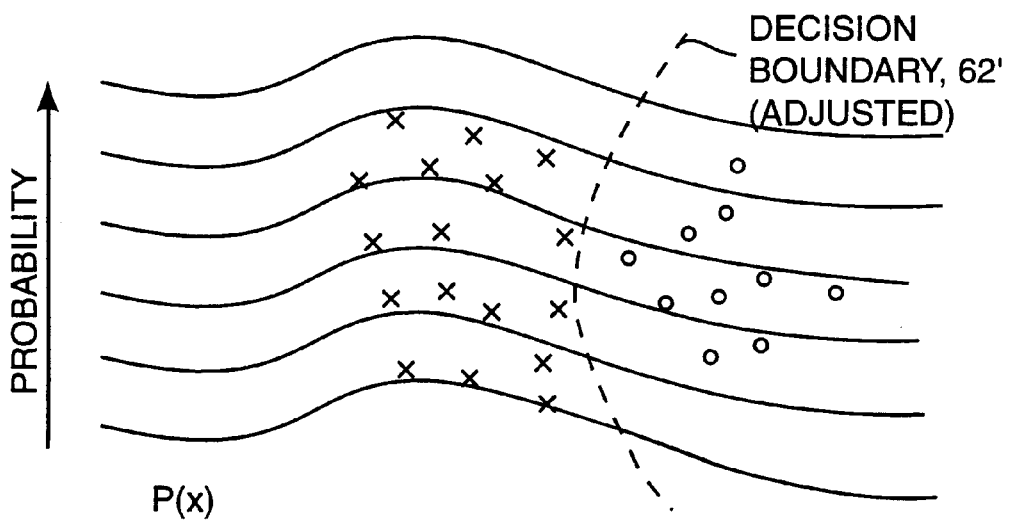
FIG. 8B is a diagram showing how the decision boundary of FIG. 8A is modified in accordance with employing the subject invention.

Classification requires two Markov models, one for the o's, whose distribution is depicted in FIG. 6A, and one for the x's as shown in FIG. 6B. Note that both distributions are defined over the same space. If one superimposes them, and looks where they have equal values or, pictorially, equal heights, one can draw a line that is called the decision boundary 60 as illustrated in FIG. 7. FIG. 8A shows the decision boundary 62 obtained from conventional Markov models, along with probability contours 64 for the x distribution. FIG. 8B shows how this decision boundary, here illustrated at 62', is modified in the subject invention, as a consequence of the x distribution being depressed in the area of similar negative examples.

Figure 9A:
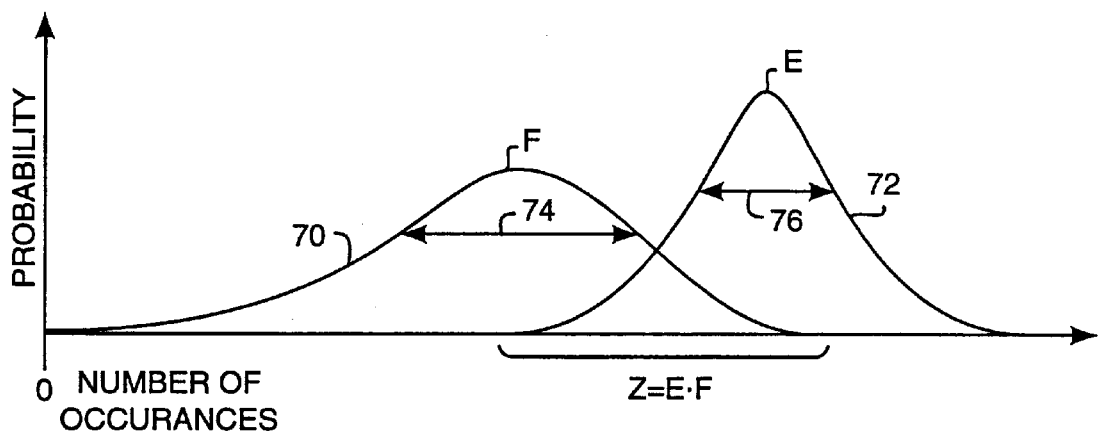
FIG. 9A is a diagram showing the probability distribution of a particular event in two classes of data which the subject system is learning to discriminate; and, FIG. 9B is a diagram showing the distribution of the difference over all random texts of how many more times a predetermined event occurs in one class of sequences as opposed to another, showing that if either of the original distributions has high variance, the result is that the distribution of difference will be broad and flat, thus limiting the effect of non-reliable discriminators.

The procedure by which weights are adjusted is now explained. Examples are sequences of events. For example, this document is a sequence of letter-pairs. FIG. 9A depicts the probability distributions of a particular event in two classes of data which the system is learning to discriminate. Taking for instance that the two classes are English and French documents, and the event of interest is the occurrence of the two-character string "ed", the low, broad probability curve 70 at left indicates that "ed" occurs less often and more variably in French. The high, sharp probability curve 72 at right indicates that "ed" occurs more often and more consistently in English. The peaks of the curves, marked "F" and "E", indicate the average number of times that "ed" appears in a French or English document, respectively. These are the means of the distributions. These means, scaled so that they sum to one, are used directly as the parameters in conventional Markov models.

The broadness of the curves as illustrated at 74 and 76 at the level of one standard deviation measures the variance of the distribution, which tells how unreliably the mean predicts the number of occurrences in a random document. This information is not used in conventional Markov models.

Figure 9B:
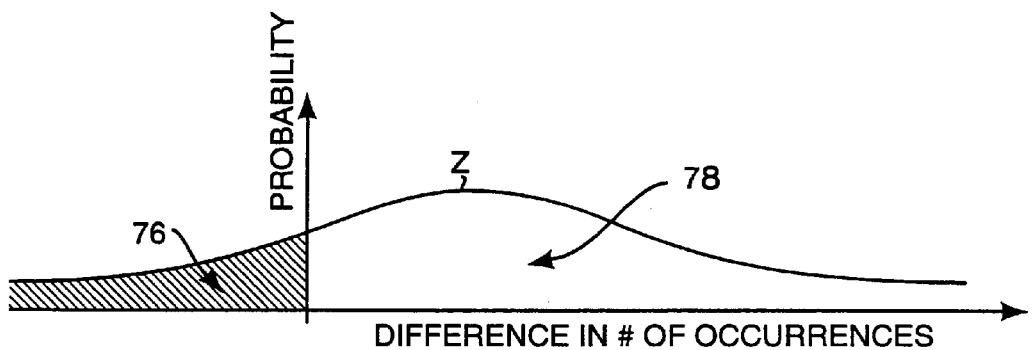

In the present illustration, one is interested in the probability that, given a random French document and a random English document, "ed" occurs more often in the English document. This quantity, which, here P(E>F), will be used to calculate a weight in the English Markov discriminator. Given an English text and a French text, ed(E,F) is the count of how many more times "ed" appears in the English text. The distribution of this difference over all random texts is shown in FIG. 9B. It is calculated by locating its peak Z at the difference between the two means shown in FIG. 9A. That is, Z=E−F. Its variance V, or broadness, is the sum of the variances of curve 70 and curve 72. Note that its left-hand tail 76 is in the negative half-plane. Sometimes a French text will have more "ed"s than an English text and ed(E,F) will be negative. The unshaded area 78 under the curve in the positive half plane is the probability that er(E,F) will be positive, which is exactly the quantity P(E>F) sought. The formula for this value, is P(E>F)=½+erf(Z/sqrt(2 V))/2. Similarly, P(F>E)=1−P(E>F).

The set of values, P(E>F) for each two letter pair "ea", "eb", "ec", "ed", . . . "ez", are normalized to sum to one and are then used as parameters in the English Markov discriminator. Note that if either or both of the original distributions has high variance, then so will the distribution of differences, and it will be broad and flat. This means that P(F>E) and P(E>F) will both be close to ½, even if E if much greater than F or vice versa. In this way, features that are not reliable discriminators are discounted.

Now consider the case of "er". It is quite frequent in English, and thus in the conventional English Markov model the corresponding parameter value is large. However, it is also frequent in French, so in this case P(F>E) and P(E>F) are both near ½. After normalization, both will yield fairly small parameter values in their respective Markov discriminators. This depresses the probability of sequences in which "er" is frequent, leading to the effect shown in FIG. 4.

Having above indicated several embodiments of the Subject Invention, it will occur to those skilled in the art that modifications and alternatives can be practiced within the spirit of the invention. For instance, it will be appreciated that the above procedure is equally applicable to hidden Markov models given the transition expectations as computed by conventional dynamic programming techniques. It is accordingly intended to define the scope of the invention only as indicated in the following claims.

What is claimed is:

1. A Markov model discriminator system comprising:

means for providing an input sequence to be classified;

means coupled to said means for providing an input sequence for performing two different model likelihood calculations based on two different Markov model parameters representing two different classes of examples, each class having a predetermined characteristic on which discrimination between classes is based;

means for comparing said likelihood calculations as to which of said characteristics said input sequence is likely to exhibit based on said comparison, thus to classify said input sequence; and means for training said means coupled to said input sequence for performing said two calculations by generating said Markov model parameters taking onto account both negative and positive examples of said different classes.

2. The system of claim 1 wherein said Markov Model discriminator is a hidden Markov Model discriminator.

3. The system of claim 1, wherein said training means includes means for separating said sequence into subsequences;

means for comparing the mean counts of types of subsequences between said two classes, with the variance in said counts across examples establishing a quality factor as to reliability such that if the differences are wide but the variation is narrow, the corresponding characteristic is highly discriminant; and means responsive to said comparison for assigning a higher value to the corresponding parameter, thus to provide a weighting for the corresponding Markov model parameters that takes into account both positive and negative examples of a class.

4. The system of claim 3 wherein said subsequences correspond to positive and negative sequences, wherein said training means includes means for establishing the occurrence of a symbol i and a symbol j in said sequence, thus to form said subsequences, and means for obtaining all two-symbol counts over all positive sequences and over all negative sequences and wherein said Markov Model parameters are obtained in accordance with the following calculations:

$$P_{ij} = \frac{1}{2} + \frac{1}{2} erf\left(\frac{M_{i|j+} - M_{i|j-}}{\sqrt{2(\sigma^2_{i|j+} + \sigma^2_{i|j-})}}\right)$$

$$P_{i|j} = P_{ij} \bigg/ \sum_{k=1}^{N} P_{kj}$$

where $P_{i|j}$ are the transition parameters of the Markov Model where $M_{i|j+}$ is the average number of times symbol i follows symbol j in the positive example sequences thus to establish a corresponding mean, where $\sigma^2_{i|j+}$ is the variance of $M_{i|j+}$, where $M_{i|j-}$ is the average number of times symbol i follows symbol j in the negative example sequences thus to establish a corresponding mean, and where $\sigma^2_{i|j-}$ is the variance of $M_{i|j-}$.

5. A method for training Markov Models comprising the steps of:
identifying a first training set representing first sequences corresponding to a first classification;
identifying a second training set representing second sequences, different than the first sequences, corresponding to a second classification; and
establishing Markov Model parameters for the first classification based on the first and the second training sets.

6. A method according to claim 5, further comprising the steps of:
generating first Markov Model coefficients associated with the first training set;
generating second Markov Model coefficients associated with the second training set; and
adjusting the generated first coefficients to be maximally dissimilar to the second coefficients;
wherein the Markov Model parameters are established based upon the adjusted first coefficients.

7. A method according to claim 5, wherein the establishing of the Markov Model parameters includes:
generating Markov Model parameters corresponding to both the first sequences and the second sequences; and
increasing those of the generated Markov Model parameters which correspond primarily to the first sequences and decreasing those of the generated Markov Model parameters which correspond primarily to the second sequences.

8. A method according to claim 7, wherein:
the establishing of the Markov Model parameters includes assigning a weight to each of the generated Markov Model parameters based upon a variance in the correspondence of that parameter to the first sequences and in the correspondence of that parameter to the second sequences;
each of the increased Markov Model parameters is increased by an amount based on its assigned weight; and
each of the decreased Markov Model parameters is decreased by an amount based on its assigned weight.

9. A method according to claim 5, wherein the established Markov Model parameters are first Markov Model parameters and further comprising the step of:
establishing second Markov Model parameters for the second classification based on the first and the second training sets.

10. A method according to claim 9, further comprising the steps of:
generating first Markov Model coefficients associated with the first training set;
generating second Markov Model coefficients associated with the second training set;
adjusting the generated first coefficients to be maximally dissimilar to the second coefficients; and
adjusting the generated second coefficients to be maximally dissimilar to the first coefficients;
wherein the first Markov Model parameters are established based upon the adjusted first coefficients and the second Markov Model parameters are established based upon the adjusted second coefficients.

11. A method according to claim 9, wherein the establishing of first and the second Markov Model parameters includes:
generating Markov Model parameters corresponding to both the first sequences and the second sequences;
increasing those of the generated Markov Model parameters which correspond primarily to the first sequences to form first increased parameters and decreasing those of the generated Markov Model parameters which correspond primarily to the second sequences to form first decreased parameters; and
increasing those of the generated Markov Model parameters which correspond primarily to the second sequences to form second increased parameters and decreasing those of the generated Markov Model parameters which correspond primarily to the first sequences to form second decreased parameters.

12. A method according to claim 11, wherein:
the establishing of the first Markov Model parameters includes assigning a first weight to each of the generated Markov Model parameters based upon a variance in the correspondence of the parameter to the first sequences and in the correspondence of the parameter to the second sequences;
each of the first increased parameters is increased by an amount based upon its assigned first weight;
each of the first decreased parameters is decreased by an amount based upon its assigned first weight
the establishing of the second Markov Model parameters includes assigning a second weight to each of the generated Markov Model parameters based upon a variance in the correspondence of the parameter to the first sequences and in the correspondence of the parameter to the second sequences
each of the second increased parameters is increased by an amount based upon its assigned second weight; and
each of the decreased second parameters is decreased by an amount based upon its assigned second weight.

13. A system for classifying sequences comprising:
a parameter estimator configured to receive a first training set representing first sequences having a first classification and a second training set representing second sequences, different than the first sequences, having a second classification, and to establish Markov Model parameters for the first classification based on the first and the second training sets; and
a classifier configured to receive a classification set representing third sequences having an unknown classification and to classify the third sequences based upon the established Markov Model parameters.

14. A system according to claim 13, wherein:

the parameter estimator is further configured to generate first Markov Model coefficients associated with the first training set and second Markov Model coefficients associated with the second training set, to adjust the generated first coefficients to be maximally dissimilar to the second coefficients, and to establish the Markov Model parameters based on the adjusted first coefficients.

15. A system according to claim 13, wherein:

the parameter estimator is further configured to generate Markov Model parameters corresponding to both the first sequences and the second sequences, to increase those of the generated Markov Model parameters which correspond primarily to the first sequences and to decrease those of the generated Markov Model parameters which correspond primarily to the second sequences, and to establish the Markov Model parameters based on the increased and decreased Markov Model parameters.

16. A system according to claim 15, wherein:

the parameter estimator is further configured to assign a weight to each of the generated Markov Model parameters based upon a variance in the correspondence of that parameter to the first sequences and in the correspondence of that parameter to the second sequences, to increase each of the increased Markov Model parameters by an amount corresponding to its assigned weight, to decrease each of the decreased Markov Model parameters by an amount corresponding to its assigned weight.

17. A system according to claim 13, wherein the parameter estimator is a first parameter estimator, the Markov Model parameters are first Markov Model parameters, and further comprising:

a second parameter estimator configured to receive a first training set representing first sequences having a first classification and a second training set representing second sequences, different than the first sequences, having a second classification, and to establish second Markov Model parameters for the second classification based on the first and the second training sets;

wherein the classifier is further configured to classify the third sequences based upon the established second Markov Model parameters.

18. A system according to claim 17, wherein:

the first parameter estimator is further configured to generate first Markov Model coefficients associated with the first training set and second Markov Model coefficients associated with the second training set, to adjust the generated first coefficients to be maximally dissimilar to the second coefficients, and to establish the first Markov Model parameters based on the adjusted first coefficients; and the second parameter estimator is further configured to generate third Markov Model coefficients associated with the first training set and fourth Markov Model coefficients associated with the second training set, to adjust the generated fourth coefficients to be maximally dissimilar to the third coefficients, and to establish the second Markov Model parameters based on the adjusted fourth coefficients.

19. A system according to claim 17, wherein:

the first parameter estimator is further configured to generate Markor Model parameters corresponding to both the first sequences and the second sequences, to increase those of the generated Markov Model parameters which correspond primarily to the first sequences to form first increased parameters and to decrease those of the generated Markov Model parameters which correspond primarily to the second sequences to form first decreased parameters, and to establish the first Markov Model parameters based on the first increased and the first decreased parameters; and the second parameter estimator is further configured to generate Markov Model parameters corresponding to both the first sequences and the second sequences, to increase those of the generated Markov Model parameters which correspond primarily to the second sequences to form second increased parameters and to decrease those of the generated Markov Model parameters which correspond primarily to the first sequences to form second decreased parameters, and to establish the second Markov Model parameters based on the second increased and the second decreased parameters.

20. A system according to claim 19, wherein:

the first parameter estimator is further configured to assign a first weight to each of the generated Markov Model parameters based upon a variance in the correspondence of the parameter to the first sequences and in the correspondence of the parameter to the second sequences, to increase each of the first increased parameters by an amount corresponding to its assigned first weight, to decrease each of the first decreased parameters by an amount corresponding to its assigned first weight; and the second parameter estimator is further configured to assign a second weight to each of the generated Markov Model parameters based upon a variance in the correspondence of the parameter to the first sequences and in the correspondence of the parameter to the second sequences, to increase each of the second increased parameters by an amount corresponding to its assigned second weight, to decrease each of the second decreased parameters by an amount corresponding to its assigned second weight.

* * * * *